(12) United States Patent
Pitsch et al.

(10) Patent No.: US 8,874,717 B2
(45) Date of Patent: Oct. 28, 2014

(54) TECHNIQUES TO DISCOVER SERVICES RECURSIVELY IN A DISTRIBUTED ENVIRONMENT

(75) Inventors: Yves Pitsch, Mercer Island, WA (US); Rastan Boroujerdi, Bellevue, WA (US); Amit Sehgal, Redmond, WA (US); Santhosh Kopparapu, Redmond, WA (US); Yong Lim, Sammamish, WA (US); Deepak Rao, Isaaquah, WA (US); Vadim Eydelman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 140 days.

(21) Appl. No.: 13/538,357

(22) Filed: Jun. 29, 2012

(65) Prior Publication Data
US 2014/0006579 A1   Jan. 2, 2014

(51) Int. Cl.
*G06F 15/16*   (2006.01)

(52) U.S. Cl.
USPC ............ 709/223; 709/224; 709/227; 370/338

(58) Field of Classification Search
CPC ..... H04L 67/2823; H04L 67/16; H04L 67/18; H04L 67/28; H04L 67/1002; H04L 67/1021; H04L 67/2814; G06F 11/327; G06F 15/16
USPC ................... 709/223, 224, 227; 370/370, 338
See application file for complete search history.

(56) References Cited

U.S. PATENT DOCUMENTS

| | | | | |
|---|---|---|---|---|
| 6,658,483 | B1 * | 12/2003 | Iwamoto et al. | 709/246 |
| 7,240,325 | B2 | 7/2007 | Keller | |
| 7,583,643 | B2 * | 9/2009 | Smith et al. | 370/338 |
| 8,621,260 | B1 * | 12/2013 | Sontakke et al. | 714/4.11 |
| 2005/0174950 | A1 | 8/2005 | Ayyagari | |
| 2007/0007336 | A1 * | 1/2007 | Kindberg | 235/382 |
| 2009/0222504 | A1 | 9/2009 | Vandanapu | |
| 2010/0030893 | A1 | 2/2010 | Berg et al. | |
| 2010/0058331 | A1 | 3/2010 | Berg et al. | |
| 2010/0180300 | A1 * | 7/2010 | Carpenter et al. | 725/40 |

(Continued)

OTHER PUBLICATIONS

Kodama, et al., "Setting-up the Topology", Retrieved at <<http://docs.oracle.corn/cd/E21764_01/integrate.1111/e12643/setup_topology.htm, Retrieved Date: Feb. 21, 2012, pp. 27.

(Continued)

*Primary Examiner* — Tesfay Yohannes
(74) *Attorney, Agent, or Firm* — Andrew Smith; Raghu Chinagudabha; Micky Minhas

(57) ABSTRACT

Techniques to recursively discover services in a distributed environment may include receiving a request, including a unique client identifier, from a client device to access a home resource at a services site. The services site may identify which services site is mapped to the client domain of the unique client identifier in the request. If the services site that received the request is not the services site identified by the client domain, the services site that received the request may provide a redirect token that includes a link to the identified services site to the client device. Otherwise, the services site that received the request may provide one or more links to resources in a cluster within the services site. The links to resources may include a link to the requested home resource. Other embodiments are described and claimed.

20 Claims, 12 Drawing Sheets

(56) References Cited

U.S. PATENT DOCUMENTS

| | | | |
|---|---|---|---|
| 2010/0325260 A1* | 12/2010 | Halla-Aho et al. | 709/224 |
| 2012/0131216 A1* | 5/2012 | Jain et al. | 709/230 |
| 2012/0151046 A1* | 6/2012 | Weiss et al. | 709/224 |
| 2012/0151047 A1* | 6/2012 | Hodges et al. | 709/224 |
| 2012/0278607 A1* | 11/2012 | Polat et al. | 713/100 |
| 2013/0047216 A1* | 2/2013 | Ajitomi et al. | 726/4 |
| 2014/0006579 A1* | 1/2014 | Pitsch et al. | 709/223 |

OTHER PUBLICATIONS

"Deployment Topology Considerations", Retrieved at <<http://publib.boulder.ibm.com/infocenter/clmhelp/v3r0m1/index.jsp?topic=%2Fcom.ibm.jazz.install.doe%Ftopics%Fc_deployment_topology_considerations.html >>, Retrieved Date: Feb. 21, 2012, pp. 5.

"Data Center Design—IP Network Infrastructure", Retrieved at <<http://www.cisco.com/en/US/docs/solutions/ Enterprise/Data_Center/DC_3_0/Dc-3_0_IPInfra.html>>, Apr. 26, 2009, pp. 35.

* cited by examiner

Mapping Table 500

| DOMAIN | SERVICES SITE |
|---|---|
| domain.com | Services site 1 |
| abc.com | Services site 2 |
| xyz.net | Services site 3 |
| school.edu | Services site 4 |

*FIG. 5*

TECHNIQUES TO DISCOVER SERVICES RECURSIVELY IN A DISTRIBUTED ENVIRONMENT

BACKGROUND

Many computing services are being offered in various types of distributed environments. Businesses, for example, may have many locations, each with its own network topography. An employee may be based in one location, but when traveling may need to access data or services while in a different location. Some topologies may be distributed between on-premises equipment and "cloud" deployments. Some users may be assigned to a "home" server or site. When a user attempts to access their home site from a different location or node in the topology, the other locations may not have knowledge about the global topology, and may therefore not know how to redirect the user's attempted access. In addition, the user, and the user's client device, may not know how to access the home site from outside of the home node. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to discover services recursively in a distributed environment. Some embodiments are particularly directed to techniques for a client device to discover services recursively in a distributed environment where an individual node in a local topology is unaware of the global topology into which it fits. In one embodiment, for example, a technique may include receiving a request, including a unique client identifier, such as, but not limited to, an electronic mail (e-mail) address, from a client to access a home resource at a services site. The services site may identify which services site is mapped to the client domain of the client in the request. If the services site that received the request is not the services site identified by the client domain, the services site that received the request may redirect the client to a site which is capable of servicing the client's request. Otherwise, the services site that received the request may provide a user token in response to the request, where the user token includes one or more links to resources in a cluster within the services site. The links to resources may include a link to the requested home resource. In the event that the links are to resources in the wrong cluster for the requesting user, the wrong cluster may redirect the user to the correct cluster. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of a mapping table according to various embodiments.

DETAILED DESCRIPTION

Figure 1:
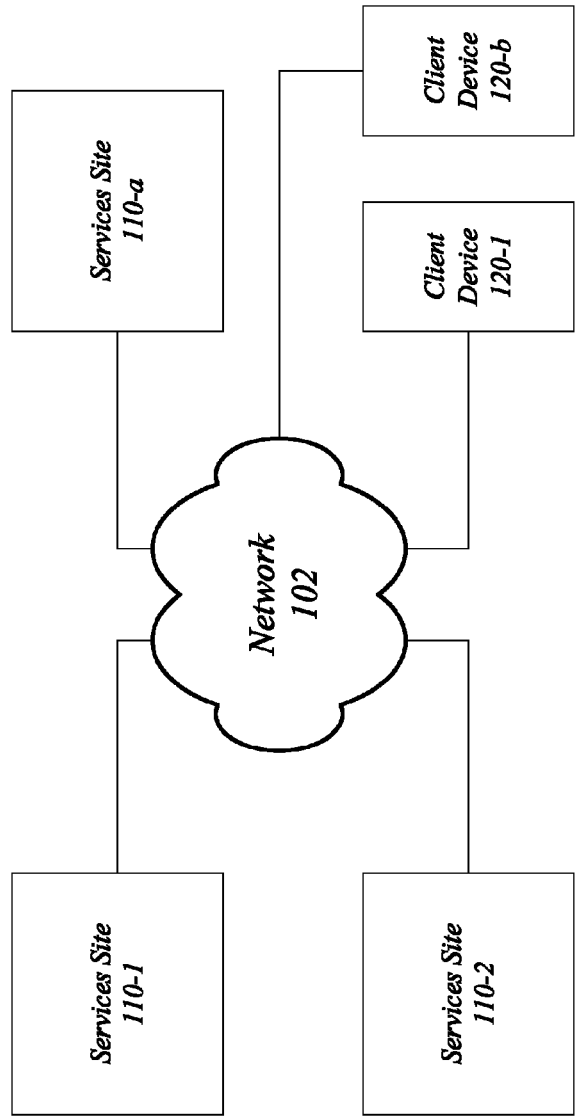
FIG. 1 illustrates an example of a distributed operational environment for various embodiments.

Various embodiments are directed to redirecting a client device to its assigned home resource when the client device attempts to connect to the home resource from outside of the home resource's topology. The embodiments may allow this redirection to take place without requiring the client device to be aware of any topology settings or even a specific home uniform resource locator (URL). The embodiments may redirect a client device using a client domain associated with a unique client identifier (referred to herein as a client domain), such as an e-mail client domain or a session initiated protocol (SIP) uniform resource identifier (URI) client domain, to determine the redirection point. Embodiments may provide a redirection module within each topological node that has access to a mapping table that maps client domains to the various topological nodes. When a client device requests access to its home resource at a different server, the redirection module may look up the client domain of the requestor in the mapping table and may provide a redirect token to the device. The redirect token may include a link to the appropriate topological node to which the client device can connect. In some cases a client device may be redirected within its topological node from one cluster to another in order to ultimately connect to the home resource. As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the specified purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the needed method steps. The structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an example of an operating environment 100 for various embodiments. In one embodiment, operating environment 100 may include one or more services sites 110-1, 110-2, 110-a. Operating environment 100 may include one or more client devices 120-1, 120-b. The services sites 110-a and the client devices 120-b may communicate over network 102. Although operating environment 100 shown in FIG. 1 has a limited number of elements in a certain topology, it may be appreciated that operating environment 100 may include more or fewer elements in alternate topologies as desired for a given implementation.

As used herein, designators such as "a" and "b" and "c" are intended to be variables representing any positive integer. Thus, for example, if an implementation sets a value for a=5, then a complete set of services sites 110-a may include services sites 110-1, 110-2, 110-3, 110-4 and 110-5. The embodiments are not limited in this context.

Operating environment 100 may include one or more services sites 110. A services site 110 may represent a topological node in a distributed system of servers and/or other devices that provide services and storage for a set of client devices, such as client devices 120. A services site 110 may itself comprise a plurality of server devices, storage devices and/or other electronic devices. A services site 110 may provide services such as, but not limited to, electronic mail service, calendar service, collaboration service, document management service, and/or any variety of applications, such as word processing, customer relations management, line of business and so forth.

In some embodiments, a services site 110 may represent a cloud deployment of services and/or data storage for a particular group or enterprise. A cloud deployment may refer to one or more servers located remotely from a physical business or other enterprise that provide services and applications as if the software providing the services and applications were installed on on-premises equipment. In some embodiments, a services site 110 may represent an on-premises deployment, where the computing devices and software applications are generally local to the entity using them. Operational environment 100 may include a combination of cloud and on-premises deployments of services sites 110. A services site 110 is described further with respect to FIG. 2.

Services sites 110 within operational environment 100 may generally represent different discrete groupings of users. For example, in the case of a global business entity, different services sites 110 may be associated with different locations, e.g. different countries. Services site 110-1 may be a European services site, while services site 110-2 may be an American services site. In another example, different services sites 110 may represent different departments of an organization. One services site 110 may be the research department services site, while another may be the legal department services site. The embodiments are not limited to these examples.

Operational environment 100 may include one or more client devices 120. A client device 120 may be any electronic device capable of communicating with a services site 110, e.g. using network 102. While a client device 120 may be a desktop computer, mobile devices are of primary interest in the present context. Client devices 120 may therefore include, in particular, but not limited to, laptop computers, tablet computers, smart phones and so forth. A user registered within operational environment 100 may use a client device 120 to access data and applications provided within operational environment 100. In an embodiment, a user may be assigned a "home" site and may therefore be associated with one specific services site 110. The resources that the particular user consumes could potentially be provided from any services site 110, however, only one services site 110 may actually recognize the user and be able to provide access to the user's home resources.

Figure 2:
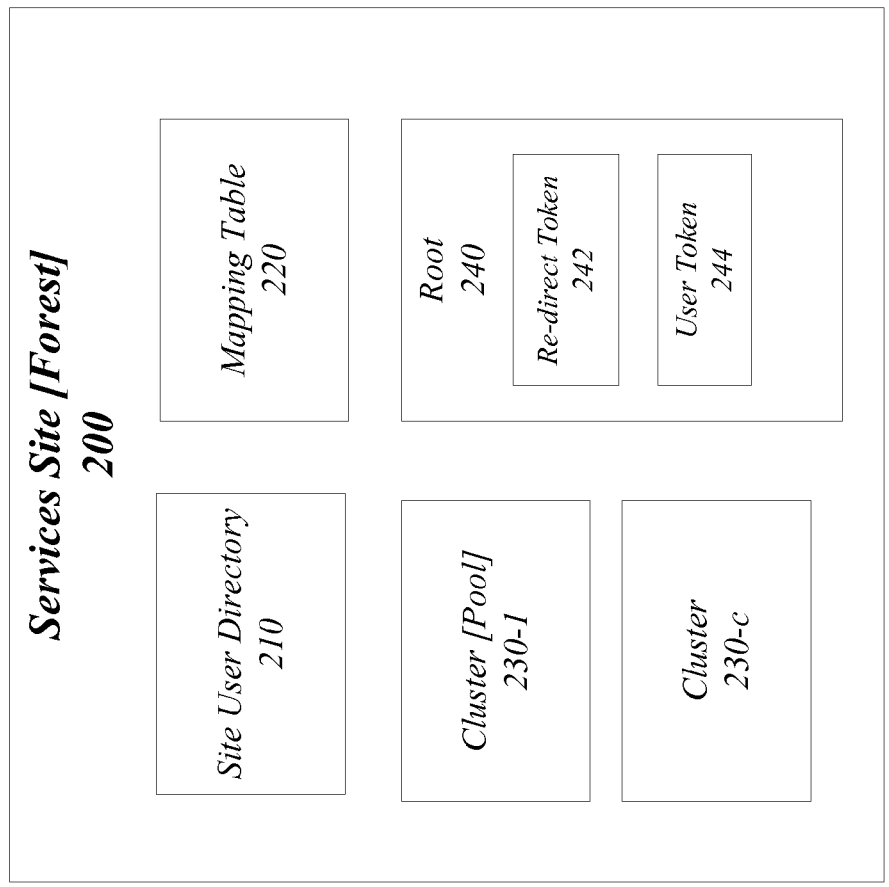
FIG. 2 illustrates an embodiment of a services site according to various embodiments.

FIG. 2 illustrates a block diagram of an embodiment of a services site 200. Services site 200 may be an example of a services site 110. Services site 200 may comprise one or more servers and/or other electronic devices that may be co-located or distributed geographically. Services site 200 may include one or more functional components, such as a root 240. Services site 200 may store and make use of data in the form of a mapping table 220 and a site user directory 210.

Services site 200, sometimes referred to as a "forest," may provide services to a set of users, who may be listed in site user directory 210. Site user directory 210 may include a listing for each user in the set. A listing may include, for example, a username, e-mail address, telephone contact information, address information, and so forth, about a specific user. Users that do not have a listing in site user directory 210 may typically not access the resources within services site 200.

Services site 200 may be assigned to provide services to a set of one or more client domains, e.g. e-mail client domains and/or SIP URI client domains. Services site 200 may, for example, provides services to users having client domains "domain.com", "domainA.com", and "domainB.com." The client domains that a given services site 200 provides services for may be listed in, for example, mapping table 220. Mapping table 220 may include an association between a specific client domain and a specific services site 200. Mapping table 220 may include all of the services sites 200 for a global topology and all of the client domains serviced by all the services sites 200 in the global topology. In an embodiment, when services site 200 receives a request from a client device to connect to a home resource, services site 200 may look up the client domain of the requesting user in mapping table 220 to determine whether the services site 200 provides services this user, and if not, which services site does. An example of a mapping table 220 is described further with respect to FIG. 4.

Services site 200 may be sub-divided into clusters 230, sometimes referred to as "pools." Clusters 230 may include groupings of users listed within site user directory 210. In an embodiment, a cluster 230 may represent a smaller regional discrete grouping of users. For example, cluster 230-1 may represent the users and computing resources for a Seattle, Wash. location, while cluster 230-c may represent the users and computing resources for a San Antonio, Tex. location. A cluster 230 may include the home resources for a user within that cluster. In an embodiment, a cluster 320 may be an on-premises deployment, while another cluster 320 may be a cloud deployment. An example of a cluster is described further with respect to FIG. 3.

Services site 200 may include a root 240. Root 240 may receive requests for a home resource from a client device. The requests may include a unique client identifier, e.g. the e-mail address, of the requesting user. Root 240 may look up the client domain of the unique client identifier in a request in mapping table 220. When the client domain of the request maps to a services site other than services site 200, root 240 may generate a re-direct token 242 that includes a link to the root of the services site to which the client domain does map. Root 240 may send a response to the requesting client that includes the re-direct token.

When the client domain of the user does map to the services site 200, root 240 may provide a user token. The requester may then be directed to authenticate itself to the location identified by the user token. Once successfully authenticated, the requestor may be returned the user resource within service site 200. User token 244 may include a link to a user resource within services site 200. In an embodiment, the link to the user resource may be an internal auto-discovery service. The link to the user resource may be, for example, a link to a particular cluster 230.

Figure 3:
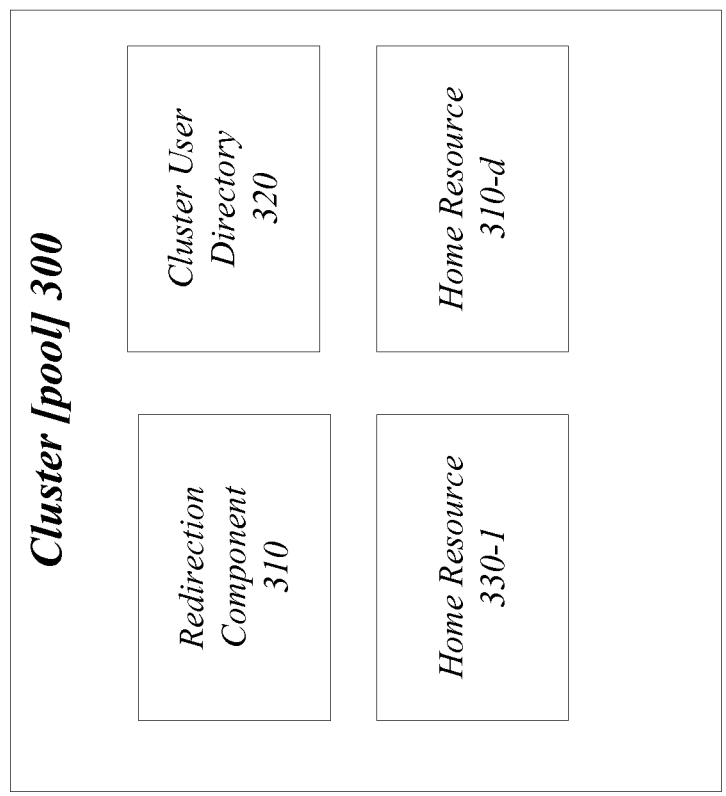
FIG. 3 illustrates an embodiment of a cluster according to various embodiments.

FIG. 3 illustrates block diagram of an embodiment of a cluster 300 for the operating environment 100. Cluster 300 may be an example of a cluster 230. Cluster 300 may comprise one or more servers and/or other electronic devices that may be co-located or distributed geographically. Cluster 300 may include one or more functional components, such as a redirection component 310. Cluster 300 may store and make use of data in the form of a cluster user directory 320 and one or more home resources 330.

Cluster 300, sometimes referred to as a "pool," may provide services to a sub-set of users in the services site 110, 200. Those users may be listed in a cluster user directory 320. Cluster user directory 320 may include a list of the users for whom cluster 300 is "home." In an embodiment, cluster user directory 320 may also include information about which cluster other users are assigned to, for redirection purposes.

Home resources 330 may generally represent services and data that a user homed at cluster 300 makes use of. For example, a home resource 330 may include the software used to support a mobile device version of an application, calendar service, address book service, and so forth.

Redirection component 310 may receive a request for a home resource, such as home resource 330-1 or for a home resource that is homed on a different cluster. Redirection component 310 may challenge the requesting device with an authentication prompt, such as a request for a password. If the request is for home resource 330-1 and the challenge is passed, the user of the requesting device may be connected to home resource 330-1 regardless of where the requesting device is physically located. If the request is for a home resource on a different cluster, redirection component 310 may provide another user token having a link to the correct cluster for the requested home resource.

Figure 4:
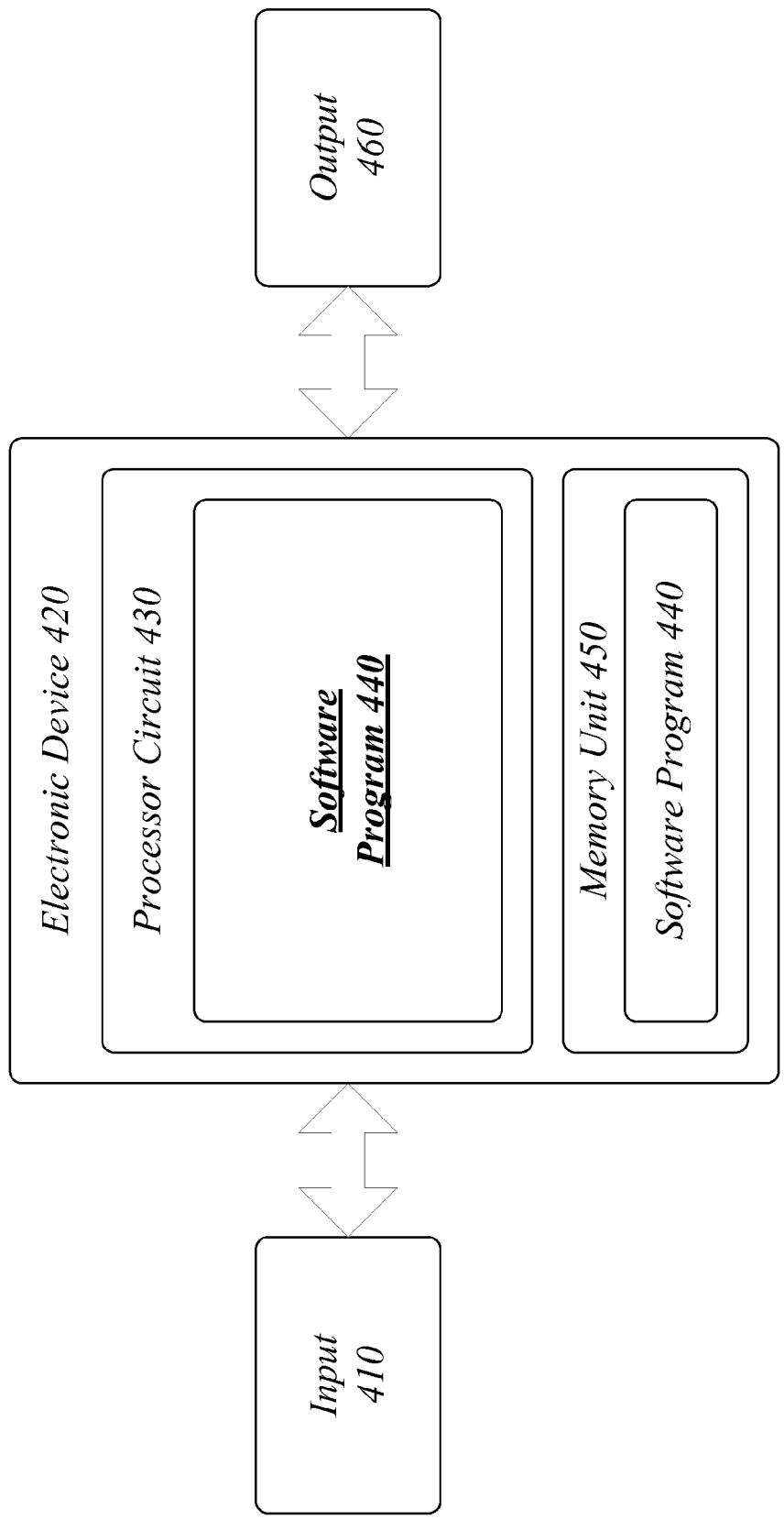
FIG. 4 illustrates an embodiment of a first system services site according to various embodiments.

FIG. 4 illustrates an embodiment of a system 400. System 400 may include an electronic device 420. Electronic device 420 may represent, for example, a client device 120 or a component of a services site 110 or cluster 230. Although system 400 shown in FIG. 4 has a limited number of elements in a certain topology, it may be appreciated that system 400 may include more or fewer elements in alternate topologies as desired for a given implementation.

Electronic device 420 may receive inputs 410, for example, user directives from an input device such as a keypad, stylus or fingertip. Inputs 410 may also include data and instructions received over a network, for example, from a services site 110 or a cluster 230.

Electronic device 420 may include a processor circuit 430 and a memory unit 450. Processor circuit 430 may be a processing unit or component as described in greater detail below. Memory unit 450 may be, for example, a system memory or other memory device capable of storing instructions and/or data for short term or long term storage.

Electronic device 420 may include a software program 440. In an embodiment, instructions for software program 440 may be stored in memory unit 450. Software program 440 may be executed on processor circuit 430 to provide some functionality on electronic device 420. For example, software program 440 may provide a calendar application, a contact management application, an e-mail client application, and so forth. The embodiments are not limited to these examples.

Software program 440 may include a component (not shown) that generates a request to connect to a home resource for software program 440. The request may be sent to a services site as output 460.

FIG. 5 illustrates an embodiment of a mapping table 500 for the operating environment 100. Mapping table 500 may be a representation of mapping table 220. Mapping table 500 may include, for example, two fields of data: a client domain field 510 and a services site field 520. Client domain field 510 may include an entry for each client domain for which a global topology provides services. Each client domain field 510 entry may be linked, mapped to, associated with or otherwise connected to a specific services site in a services site field 520 entry. A services site field 520 entry may include a link, address, reference, or other connection means to a specific services site, e.g. services site 110-1. In an embodiment, a services site field 520 entry may include a link to an auto-discovery service provided at a services site 110.

Figure 6:
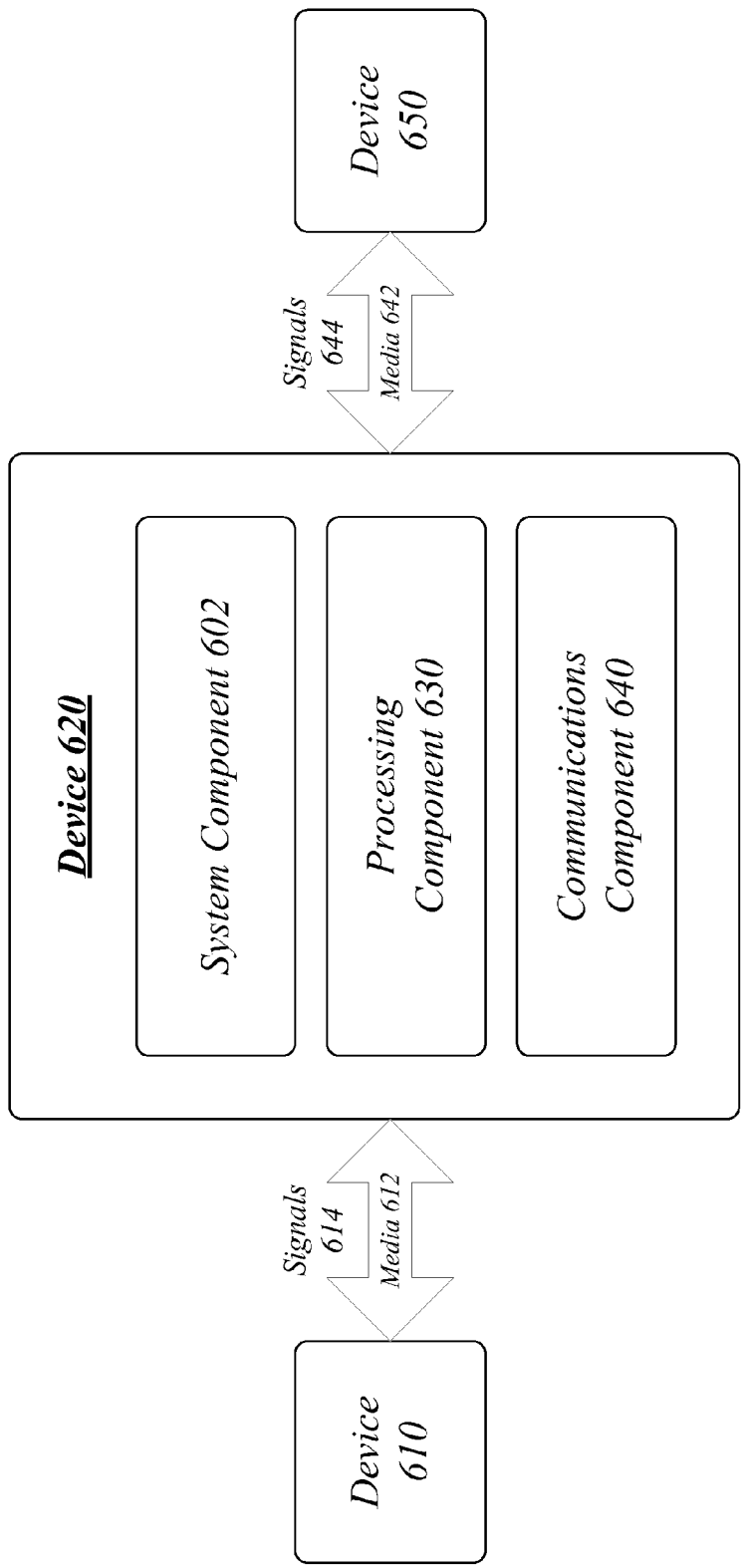
FIG. 6 illustrates an embodiment of a centralized system for the operational environment of FIG. 1.

FIG. 6 illustrates a block diagram of a centralized system 600. The centralized system 600 may implement some or all of the structure and/or operations for operating environment 100 in a single computing entity, such as entirely within a single device 620. Device 620 may represent, for example, a device that provides a services site 110, client device 120, or a cluster 230.

The device 620 may comprise any electronic device capable of receiving, processing, and sending information within operating environment 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a oneway pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 620 may include a system component 602. System component 602 may include any software, hardware or combination thereof that provides the functionality for a services site 110, client device 120, or a cluster 230.

The device 620 may execute processing operations or logic for system component 602 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 620 may execute communications operations or logic for system component 602 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612, 642 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 620 may communicate with other devices 610, 650 over a communications media 612, 642, respectively, using communications signals 614, 644, respectively, via the communications component 640. The devices 610, 650 may be internal or external to the device 620 as desired for a given implementation.

Figure 7:
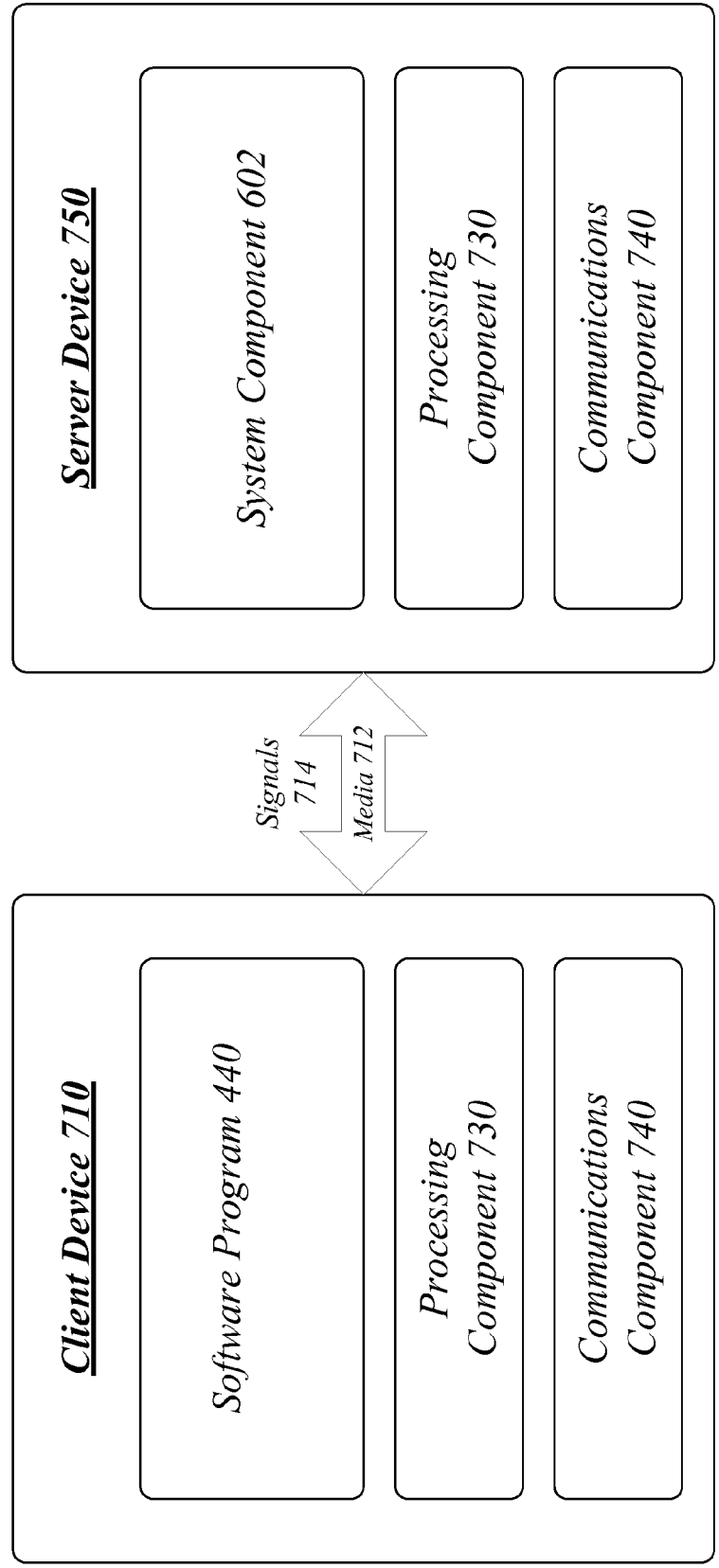
FIG. 7 illustrates an embodiment of a distributed system for the operational environment of FIG. 1.

FIG. 7 illustrates a block diagram of a distributed system 700. The distributed system 700 may distribute portions of the structure and/or operations for operating environment 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a client device 710 and a server device 750. In general, the client device 710 and the server device 750 may be the same or similar to the device 620 as described with reference to FIG. 6. For instance, the client device 710 and the server device 750 may each comprise a processing component 730 and a communications component 740 which are the same or similar to the processing component 630 and the communications component 640, respectively, as described with reference to FIG. 6. In another example, the devices 710, 750 may communicate over a communications media 712 using communications signals 714 via the communications components 740.

The client device 710 may comprise or employ one or more client programs that operate to perform various methodologies in accordance with the described embodiments. In one embodiment, for example, the client device 710 may implement software program 440. In one embodiment, client device 710 may represent a device requesting information or services from server device 750. Client device 710 may, in turn, operate as a server device for another client device.

The server device 750 may comprise or employ one or more server programs that operate to perform various methodologies in accordance with the described embodiments. In one embodiment, for example, the server device 750 may implement system component 602, which may include, for example, root 240 when server device 750 represents a services site 200, or redirection component 310 when server device 750 represents a cluster 300.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
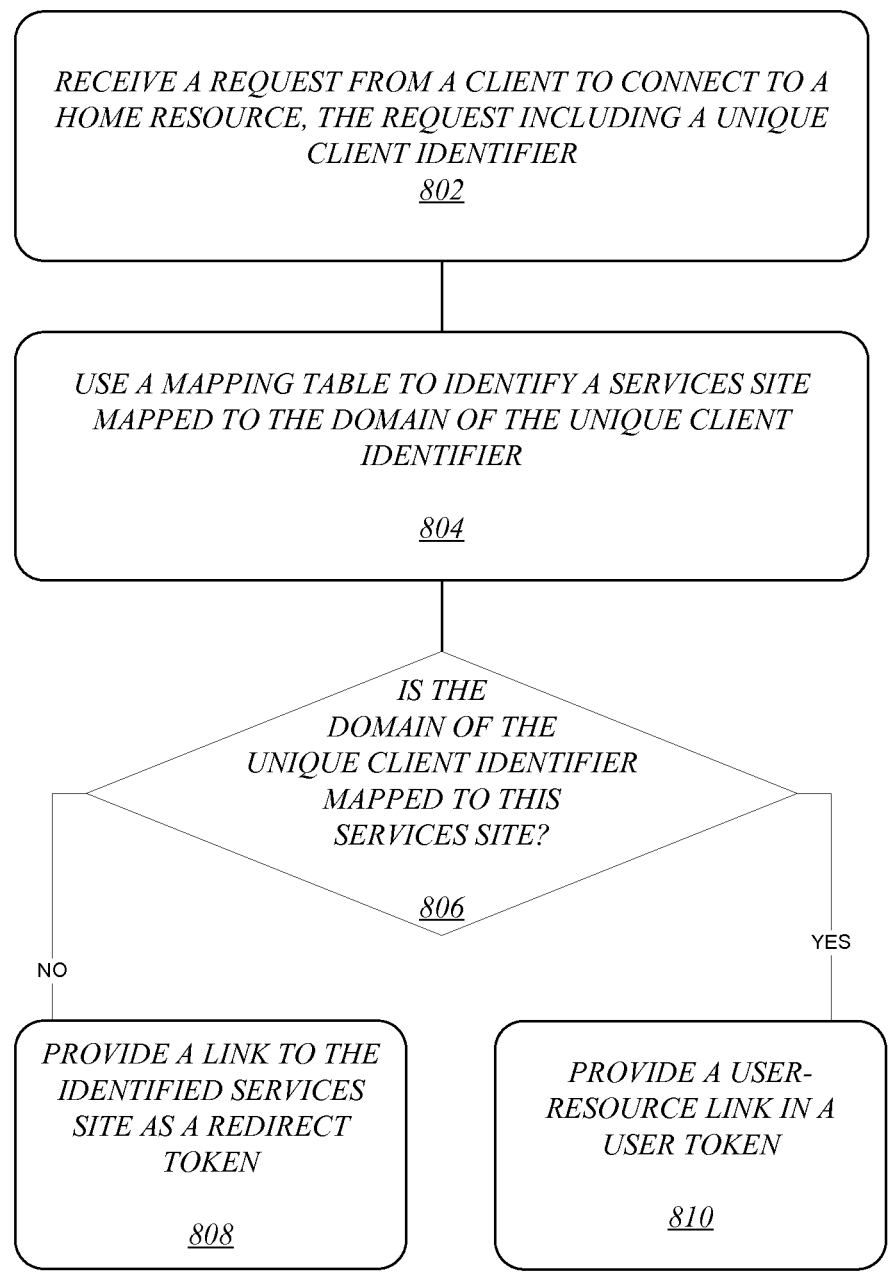
FIG. 8 illustrates an embodiment of a logic flow for redirections operations at a services site.

FIG. 8 illustrates one embodiment of a logic flow 800. Logic flow 800 may be representative of some or all of the operations executed by one or more embodiments described herein. Logic flow 800 may represent operations executed at a services site, e.g. services site 110, 200.

In the illustrated embodiment shown in FIG. 8, logic flow 800 receives a request from a client to connect to a home resource at block 202. The request may include a unique client identifier, e.g. an e-mail address, for a requesting user. For example, services site 200 may receive, at root 240, a hypertext transfer protocol (HTTP) GET request and/or a HTTP secure (HTTPS) GET request of the form "DiscoverInternal.VDomain.com?sipuri=user@vdomain.com" where "user@vdomain.com" is the e-mail address provided by the requesting client device. Services site 200 may also receive, at root 240, an HTTP GET request and/or an HTTPS GET request of the form "Discover.VDomain.com?sipuri=user@vdomain.com". In some embodiments, instead of an e-mail address, the request may include a user principal name (UPN), which may be the name of a system user in an e-mail address format, a SIP URI, or any other identifier understood by the topology. The embodiments are not limited to these examples.

Logic flow 800 may use a mapping table to identify a services site mapped to the client domain of the unique client identifier at block 804. For example, root 240 may look up "vdomain.com" from the previous example in mapping table 220. The client domain may be associated or linked to a specific services site in mapping table 220.

Logic flow 800 may determine whether the client domain of the unique client identifier is mapped to the services site that is executing logic flow 800 ("this services site") at block 806. For example, this services site may be "XYZ services site", while the services site mapped to vdomain.com is "ABC services site." Root 240 may determine that the client domain of the request is not mapped to this services site.

Logic flow 800 may provide a link to the identified services site as a redirect token to the requesting client at block 808, when the identified services site is not this services site. For example, root 240 may retrieve the link to ABC services site from mapping table 220, and generate a redirect token 242 that includes the link. The redirect token may then be sent to the requesting client.

Logic flow 800 may provide a user resource link in a user token to the requesting client at block 810, when the identified services site is this services site. For example, is the identified services site is XYZ services site, then root 240 may provide a user token 244 to the requesting client. The user token may include a link to one or more user resources on an autodiscovery server. In an embodiment, the user resource link may be sufficient for the client device to connect to the requested home resource. In some cases, the user resource link will be to the wrong cluster for the requesting user, which is addressed in reference to FIG. 10. The embodiments are not limited to this example.

Figure 9:
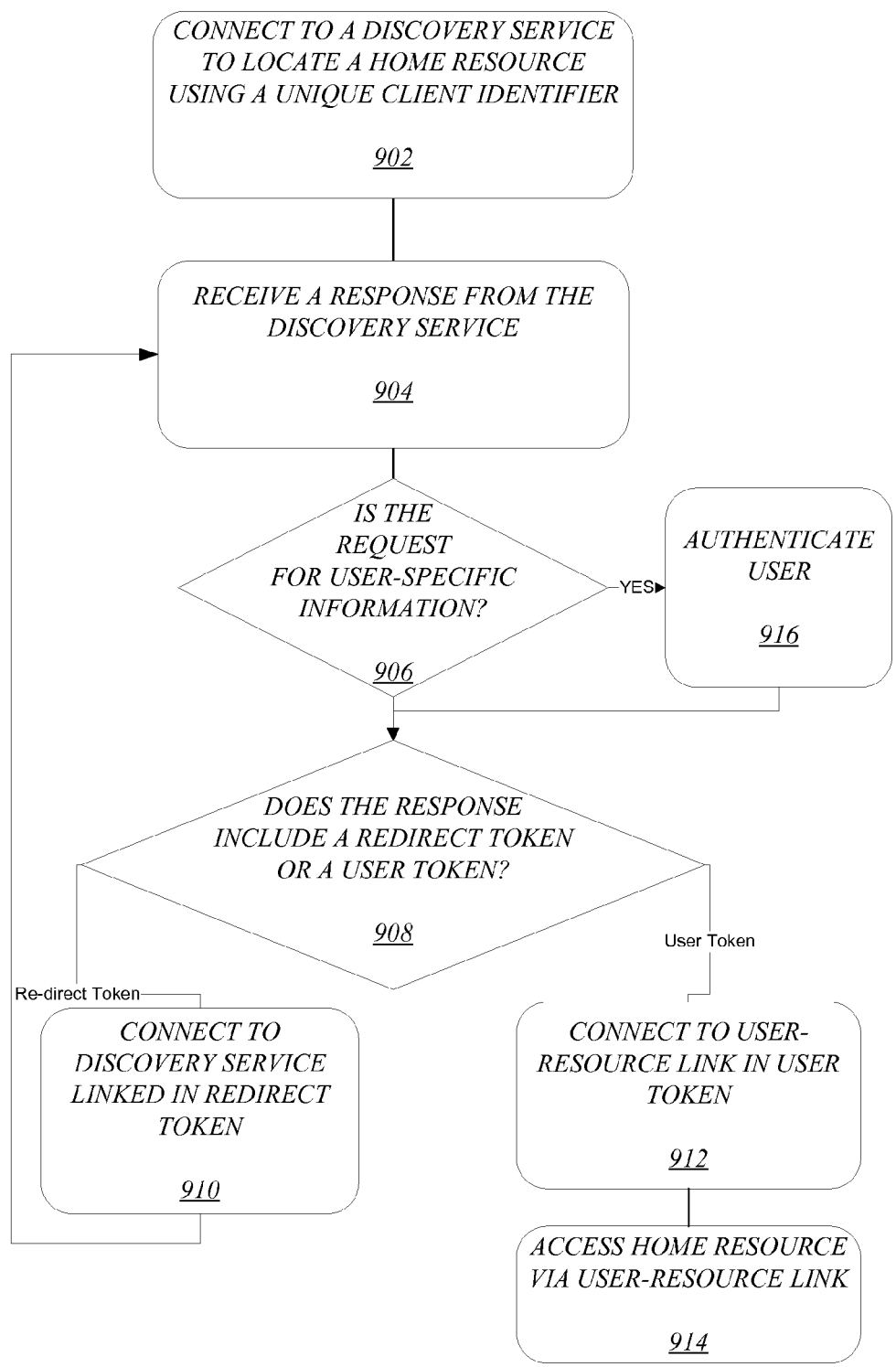
FIG. 9 illustrates an embodiment of a logic flow for operations at a client.

FIG. 9 illustrates one embodiment of a logic flow 900. Logic flow 900 may be representative of some or all of the operations executed by one or more embodiments described herein. Logic flow 900 may represent operations executed by a client device, e.g. client device 120 to connect to a home resource.

In the illustrated embodiment shown in FIG. 9, logic flow 900 may connect to a discovery service to locate a home resource using a unique client identifier, e.g. an e-mail address, at block 902. For example, a software program 440 executing on client device 120 or electronic device 420 may attempt to connect to a services site 110, 200 that includes the home resource needed by the software program. The software program 440 or device 120, 420 may prompt the user to enter a unique client identifier, e.g. an e-mail address, and a password. Software program 440 may use the unique client identifier entered by the user to construct one or more requests to connect to a discovery service, e.g. to a root of a services site.

In an embodiment, software program 440 may construct four requests as described above, namely two HTTP GET requests and two HTTPS GET requests, including a request to connect to an internal autodiscovery service and a request to connect to an external autodiscovery service. Many enterprises provide both an internal network and an external network for use by authorized users. Which network is used may depend on the location from which the user is connecting. The requests may be of the form:

HTTP GET DiscoverInternal.VDomain.com?sipuri=user@vdomain.com;
HTTPS GET DiscoverInternal.VDomain.com?sipuri=user@vdomain.com;
HTTP GET Discover.VDomain.com?sipuri=user@vdomain.com; and
HTTPS GET Discover.VDomain.com?sipuri=user@vdomain.com.

In general, one or more of the four requests may succeed. A request to the internal autodiscovery service may succeed if the requesting client is within an internal network, e.g. on the premises or in the range of a local wireless network that is internal to an enterprise. Sending both an HTTP GET and an HTTPS GET request may eliminate the problem of not knowing how a particular deployment is arranged, because some deployments may only accepts HTTPS requests while others may only accept HTTP requests.

Logic flow 900 may receive a response from the discovery service at block 904. For example, software program 440 may receive a response to the request that succeeds, e.g. a response to HTTP GET Discover.VDomain.com?sipuri=user@vdomain.com from the external discovery service. In an embodiment, the response may not be authenticated.

Logic flow 900 may determine whether the request is for user-specific information at block 906. User-specific information may include private information, encrypted information, or other information that only a specific user or set of users is authorized to access. If the request is for user-specific information, then the client may prompt the user to authenticate, e.g. with a password, an answer to a secret question, a private encryption key, and so forth, at block 916. Assuming that the authentication is successful, logic flow 900 may proceed at block 908. If the authentication fails, then the request may be refused.

Logic flow 900 may determine whether the response includes a redirect token or a user token at block 908. For example, software program 440 may parse the response to retrieve a link or other information.

Logic flow 900 may connect to a discovery service linked in a redirect token at block 910, when the response includes a redirect token. For example, when the discovery service that provides the response corresponds to a services site that does not provide services for the user's client domain, that services site will supply a link to the correct services site. Logic flow 900 may repeat beginning at block 904 when the user is redirected to another services site, until the user receives a user token.

Logic flow 900 may connect to a user resource link in a user token at block 912, when the response includes a user token. For example, when the user has connected to the appropriate services site for the supplied client domain, the services site provides a link to a user resource.

Logic flow 900 may access the home resource via the user-resource link at block 914. For example, the user token may include one or more links to various user resources for that user within the current cluster. When the user makes use of multiple services or applications at their home site, the user token may include links to each of those services or applications. When the user is in the correct cluster, which is assumed for the purposes of logic flow 900, the software program 440 can select the appropriate link that it needs to connect to its home resource. The embodiments are not limited to this example.

Figure 10:
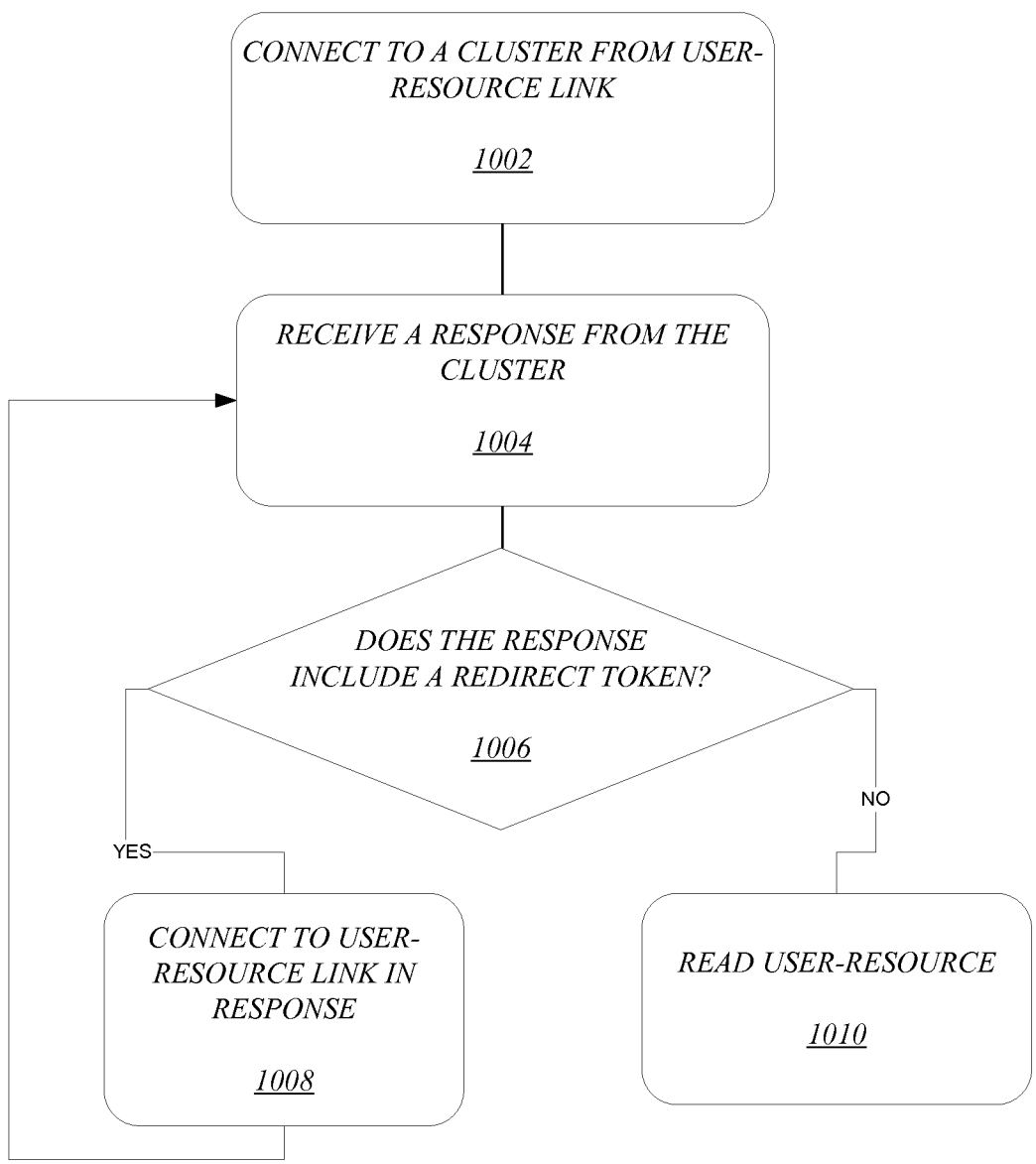
FIG. 10 illustrates an embodiment of a logic flow for redirection operations at a client within a services site.

FIG. 10 illustrates one embodiment of a logic flow 1000. Logic flow 1000 may be representative of some or all of the operations executed by one or more embodiments described herein. Logic flow 1000 may represent operations executed by a client device, e.g. client device 120, to connect to a home resource within a group of clusters at a services site.

In the illustrated embodiment shown in FIG. 10, Logic flow 1000 may connect to a cluster from a user-resource link at block 1002. Block 1002 may be similar to block 910.

Logic flow 1000 may receive a response from the cluster at block 1004. For example, redirection component 310 in the cluster 300 to which software program 440 is connecting may check whether the user, identified by the unique client identifier, is homed in that cluster. Redirection component 310 may, for example, check cluster user directory 320. In another embodiment, redirection component 310 may challenge the user to provide authentication information, such as an e-mail address or user name and password, digital certificate, biometric information (user consent may be needed), and so forth. If redirection component 310 cannot authenticate the user, or find the user in cluster user directory 320, redirection component 310 may respond to the request with a redirect token.

Logic flow 1000 may check whether the response includes a redirect token at block 1006. When the response does include a redirect token, logic flow 1000 may connect to a user-resource link in the redirect token at block 1008. For example, this may occur when the requesting client was originally directed to the wrong cluster in a services site. The When the response does not include a redirect token, logic flow 900 may connect the requesting client to the user-resource, which is the requested home resource, at block 1010. The requesting client may then read or otherwise interact with the home resource. The embodiments are not limited to this example.

The operations described in these logic flows allow a software program operating on a client device to find its home resources without having to know anything about a global topology of network services. The software program can use a unique client identifier, e.g. an e-mail address, SIP URI, UPN, and so forth, and a generic autodiscovery request to be directed to the home resource without knowing anything else about the topologies. Similarly, any services site can redirect a client to the correct services site with just the user's client domain and a mapping table. This provides, among other features, extensibility over conventional solutions which may have required the client to connect directly to a home server using a specific URL to log in to the home server. Further, user information does not need to be stored at all topology locations, because the services sites can redirect the user to the services site that does have the authentication and account functionality for the user.

Figure 11:
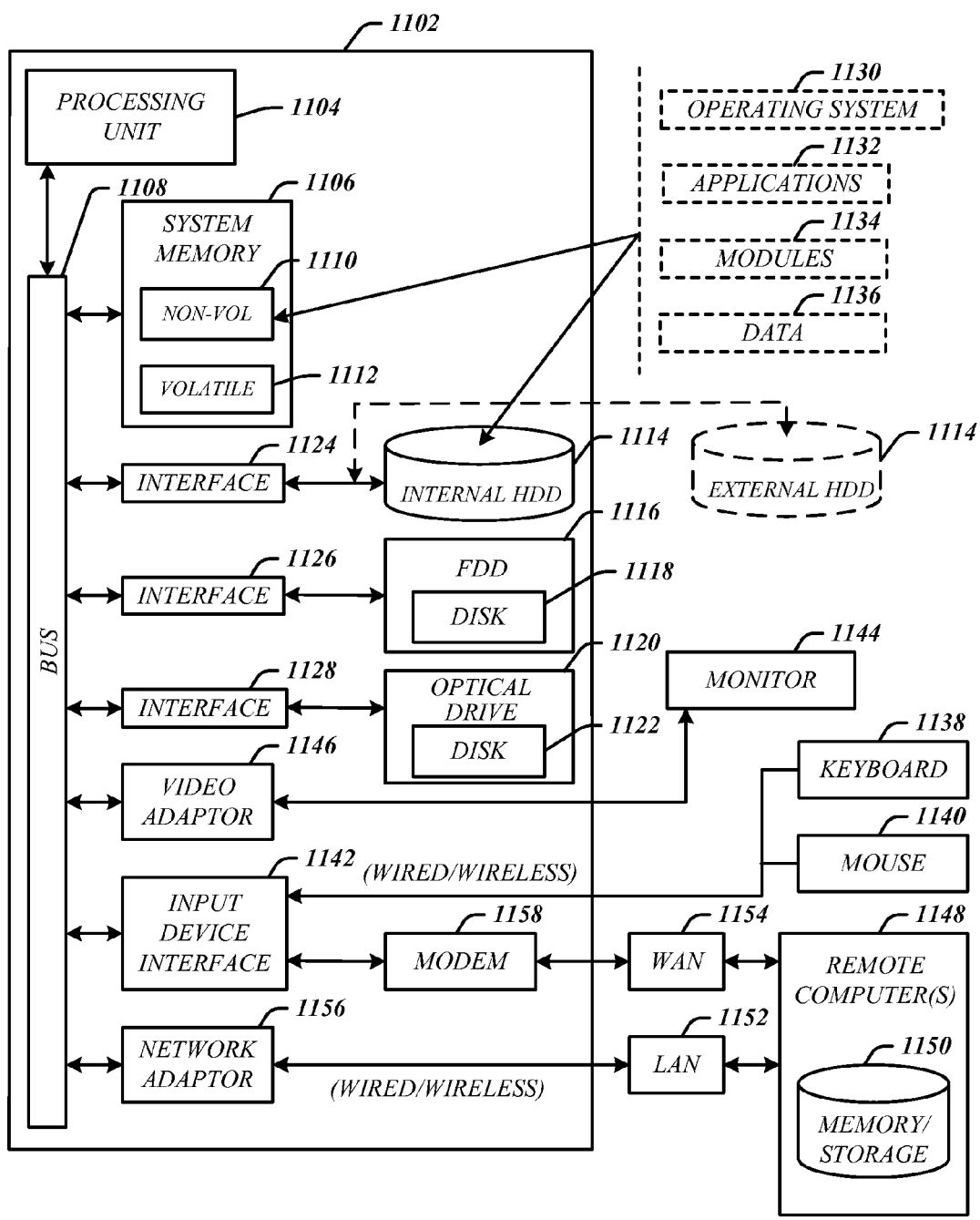
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIGS. 4, 6, and 7, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the operating environment 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
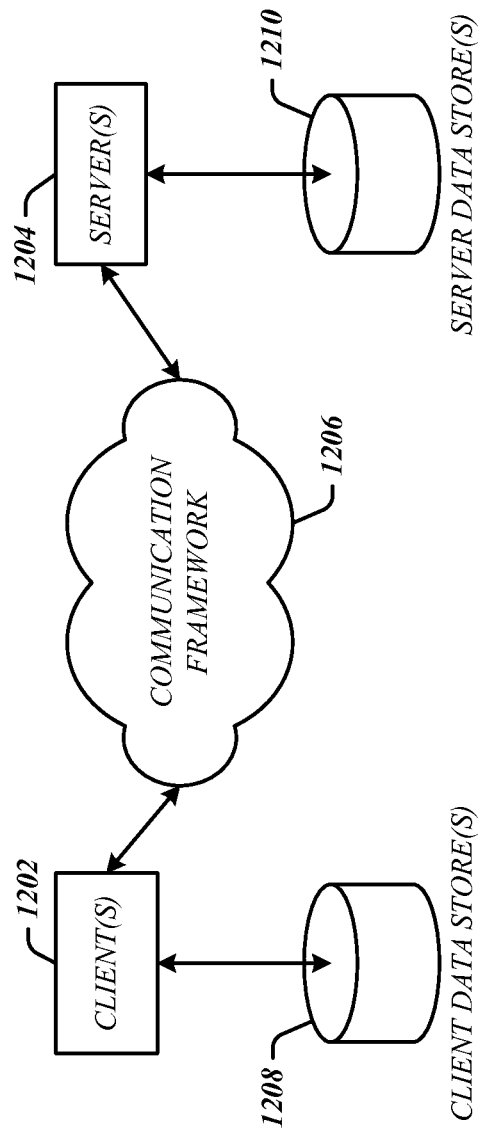
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 710. The servers 1204 may implement the server device 750. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth needed by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor circuit;
a memory unit to store a mapping table; and
root logic operative on the processor circuit to:
receive a request from a client device to connect to a home resource, the request including a unique client identifier for a user of the client device;
use the mapping table to identify a services site mapped to a client domain of the unique client identifier;
provide a link to the identified services site as a redirect token in a response to the client device when the identified services site is different from a services site that includes the apparatus and when authentication of the client device is successful; and
provide a user-resource link in a user token in a response to the client device when the identified services site is the same as a services site that includes the apparatus.

2. The apparatus of claim 1, wherein the user-resource link includes a link to the home resource.

3. The apparatus of claim 1, wherein the user-resource link includes a link to a cluster within the identified services site.

4. The apparatus of claim 3, wherein the cluster includes the home resource.

5. The apparatus of claim 1, the memory to store a site user directory, and the root logic operative to determine whether a user identified by the unique client identifier is included in the site user directory.

6. The apparatus of claim 1, comprising a cluster having a redirection component and at least one home resource.

7. The apparatus of claim 6, the redirection component operative to identify whether the cluster includes the home resource for the client device and to redirect the client device to a second cluster in the services site when the cluster does not include the home resource.

8. The apparatus of claim 1, wherein the apparatus is a component of an on-premises deployment.

9. The apparatus of claim 1, wherein the apparatus is a component of a cloud deployment.

10. A computer-implemented method, comprising:
    connecting to at least two first discovery services from a client device to locate a home resource using a unique client identifier, the home resource comprising a device located at a node in a global topology, the client device located at a different node than the home resource in the global topology, a connection to one of the at least two first discovery services fails and a connection to another one of the at least two first discovery services succeeds;
    receiving a response from the other one of the at least two discovery services, the response comprising a redirect token;
    connecting to a second discovery service at a re-direction link in the redirect token;
    receiving a response from the second discovery service, the response comprising a user token;
    connecting to a first cluster via user-resource link in the user token; and
    accessing the home resource via the user-resource link.

11. The computer-implemented method of claim 10, comprising connecting to a first internal discovery service and to a first external discovery service substantially simultaneously to locate the home resource, wherein the connection to one of the first internal and external discovery services fails and the other connection succeeds and provides a response to the client device.

12. The computer-implemented method of claim 10, comprising:
    generating a hypertext transfer protocol (HTTP) GET request for a first discovery service;
    generating a HTTP secure (HTTPS) GET request for the first discovery service;
    sending both the HTTP and the HTTPS GET requests to the first discovery service; and
    connecting to the first discovery service via one of the HTTP and the HTTPS GET requests.

13. The computer-implemented method of claim 10, comprising:
    receiving a redirect token in response to connecting to the user-resource link, the redirect token comprising a second user-resource link;
    connecting to a second cluster via the second user-resource link; and
    accessing the home resource via the second user-resource link.

14. The computer-implemented method of claim 10, comprising authenticating the client device to the first cluster.

15. The computer-implemented method of claim 10, wherein the response from the other one of the at least two discovery services comprises a user token, the method comprising:
    connecting to a first cluster via user-resource link in the user token from a first discovery service; and
    accessing the home resource via the user-resource link.

16. At least one computer-readable storage memory comprising instructions that, when executed by a processor, cause a system to:
    receive a request from a client device to connect to a home resource when the client device and the home resource are not co-located, the request including a unique client identifier;
    use a mapping table to identify a services site mapped to a client domain of the unique client identifier;
    provide a link to the identified services site as a redirect token in a response to the client device when the identified services site is different from a services site that includes the system; and
    provide a user-resource link in a user token in a response to the client device when the identified services site is the same as a services site that includes the system.

17. The computer-readable storage memory of claim 16, comprising instructions that when executed cause the system to identify whether a cluster includes the home resource for the client device, and to redirect the client device to a second cluster in the services site when the cluster does not include the home resource.

18. The computer-readable storage memory of claim 17, wherein the user-resource link includes a link to the home resource.

19. The computer-readable storage memory of claim 17, wherein the user-resource link includes a link to a cluster within the identified services site.

20. The computer-readable storage memory of claim 17, comprising instructions that when executed cause the system to:
    request authentication of the client device;
    connect the client device to the home resource when the authentication is successful; and
    provide a redirect token to the client device when the authentication fails, the redirect token including a link to a different cluster than a cluster that requested authentication.

* * * * *